US012793406B2

(12) United States Patent
Lee et al.

(10) Patent No.: US 12,793,406 B2
(45) Date of Patent: Nov. 10, 2026

(54) ELECTRONIC DEVICE AND METHOD FOR PROVIDING LOCATION-BASED SERVICE

(71) Applicant: Samsung Electronics Co., Ltd., Suwon-si (KR)

(72) Inventors: Jaemyeon Lee, Suwon-si (KR); Myungkil Kang, Suwon-si (KR); Kookyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/620,518

(22) Filed: Mar. 28, 2024

(65) Prior Publication Data

US 2024/0240954 A1 Jul. 18, 2024

Related U.S. Application Data

(63) Continuation of application No. PCT/KR2022/012404, filed on Aug. 19, 2022.

(30) Foreign Application Priority Data

Oct. 9, 2021 (KR) ........................ 10-2021-0134499
Nov. 1, 2021 (KR) ........................ 10-2021-0148333

(51) Int. Cl.
*G06V 20/10* (2022.01)
*G01C 21/36* (2006.01)
*G06T 11/65* (2026.01)

(52) U.S. Cl.
CPC ......... *G06V 20/10* (2022.01); *G01C 21/3602* (2013.01); *G06T 11/65* (2026.01)

(58) Field of Classification Search
CPC ... G01C 21/3602; G06T 2200/24; G06T 7/07; G06T 11/60
See application file for complete search history.

(56) References Cited

U.S. PATENT DOCUMENTS 10,051,242 B2 8/2018 Joe
10,380,469 B2 8/2019 Troy et al.
(Continued)

FOREIGN PATENT DOCUMENTS

JP 2006134340 A 5/2006
JP 5148950 B2 12/2012
(Continued)

OTHER PUBLICATIONS

Lee, M. J. L., Hsu, L. T., & Ng, H. F. (Sep. 13, 2021). Semantic VPS for smartphone localization in challenging urban environments. Sensors, 21(18), 6137. (Year: 2021).*
(Continued)

*Primary Examiner* — Hitesh Patel
*Assistant Examiner* — Tabitha Kress
(74) *Attorney, Agent, or Firm* — Nixon & Vanderhye P.C.

(57) ABSTRACT

At least one processor, comprising processing circuitry of an electronic device according to an embodiment may be individually and/or collectively configured to: identify, from among a plurality of indexes for recognizing a plurality of external objects, at least one index for recognizing at least one external object among the plurality of external objects; display based on identifying that the at least one index satisfies a designated condition, a visual affordance for guiding the acquisition of an image including at least one visual object corresponding to at least a portion of the at least one external object; and adjust the location of the electronic device from a first location to a second location.

20 Claims, 13 Drawing Sheets

(56) References Cited

U.S. PATENT DOCUMENTS

| | | | |
|---|---|---|---|
| 10,760,922 B2 | 9/2020 | Waldman | |
| 11,380,012 B2 | 7/2022 | Xia et al. | |
| 2014/0309925 A1 | 10/2014 | Morato et al. | |
| 2020/0110183 A1 | 4/2020 | Won | |
| 2020/0401617 A1 | 12/2020 | Spiegel et al. | |
| 2021/0097714 A1 | 4/2021 | Grundhoefer et al. | |
| 2021/0136581 A1 | 5/2021 | Chen | |
| 2021/0403053 A1 | 12/2021 | Choi et al. | |
| 2022/0092872 A1 | 3/2022 | Lee et al. | |
| 2022/0180609 A1* | 6/2022 | Huang | G06T 17/05 |

FOREIGN PATENT DOCUMENTS

| | | | | |
|---|---|---|---|---|
| KR | 20180024194 A | 3/2018 | | |
| KR | 101994521 B1 | 9/2019 | | |
| KR | 20200040136 A | 4/2020 | | |
| KR | 20210036317 A | 4/2021 | | |
| KR | 20210077269 A | 6/2021 | | |
| KR | 20210106786 A | * | 8/2021 | G06F 3/011 |
| KR | 102302241 B1 | * | 9/2021 | H04N 23/64 |
| KR | 20220022350 A | | 2/2022 | |

OTHER PUBLICATIONS

Kirch, Olaf (Jan. 16, 2002). "Binary Representation Protocols". (Year: 2002).*

Feriol, F., Vivet, D., & Watanabe, Y. (2020). A review of environmental context detection for navigation based on multiple sensors. Sensors, 20(16), 4532. (Year: 2020).*

Li, S., Li, G., Wang, L., & Qin, Y. (2020). SLAM integrated mobile mapping system in complex urban environments. ISPRS Journal of Photogrammetry and Remote Sensing, 166, 316-332. (Year: 2020).*

Max Jwo Lem Lee et al., "Semantic VPS for Smartphone Localization in Challenging Urban Environments", Sensors, vol. 21, Sep. 13, 2021, 18 pages, at URL: https://doi.org/10.3390/s21186137.

International Search Report for PCT/KR2022/012404, mailed Dec. 6, 2022, 5 pages.

Written Opinion of the ISA for PCT/KR2022/012404, mailed Dec. 6, 2022, 5 pages.

* cited by examiner

ELECTRONIC DEVICE AND METHOD FOR PROVIDING LOCATION-BASED SERVICE

CROSS-REFERENCE TO RELATED APPLICATIONS

This application is a continuation of International Application No. PCT/KR2022/012404 designating the United States, filed on Aug. 19, 2022, in the Korean Intellectual Property Receiving Office and claiming priority to Korean Patent Application Nos. 10-2021-0134499, filed on Oct. 9, 2021, and 10-2021-0148333, filed on Nov. 1, 2021, in the Korean Intellectual Property Office, the disclosures of each of which are incorporated by reference herein in their entireties.

BACKGROUND

Field

The disclosure relates to an electronic device and a method for providing a location-based service.

Description of Related Art

Recently, a service providing information on objects to a user in a form of augmented reality (AR) in an urban environment are receiving attention. To this end, a visual positioning service (VPS) technology has been proposed to recognize external objects and measure location.

In order to provide a location-based service, an electronic device may have to measure a location of the electronic device. The electronic device measures the location of the electronic device through a global positioning system (GPS), but in an urban environment, accuracy of the location of the electronic device measured through the GPS may be degraded. Accordingly, the electronic device may use a VPS having higher accuracy than the GPS. In order to use the VPS, a user of the electronic device may first need to perform an operation for scanning an external environment through a camera. Even in a situation where the accuracy of the location of the electronic device identified through the global positioning system (GPS) is high, the external environment should be scanned through the camera for the VPS, which may cause inconvenience to the user. A method for minimizing/reducing the operation of scanning the external environment may be required.

SUMMARY

According to an example embodiment, an electronic device may comprise: a memory configured to store instructions, a camera, a display, at least one communication circuit, and at least one processor, comprising processing circuitry, operably coupled to the memory, the camera, the display, and the at least one communication circuit. At least one processor, individually and/or collectively, may be configured to: identify a location of the electronic device as a first location, based on execution of an application, through the at least one communication circuit; identify at least one index for recognizing at least one external object located within a designated distance from the first location among a plurality of external objects, among a plurality of indexes for recognizing the plurality of external objects comprised in a digital map; identify whether the at least one index satisfies a designated condition set based on the application; display, through the display, a visual affordance for guiding to obtain an image including at least one visual object corresponding to at least in part of the at least one external object, based on the at least one index satisfying the designated condition; and after displaying the visual affordance, adjust the location of the electronic device from the first location to a second location based on the image including the at least one visual object, obtained through the camera, wherein each of the plurality of indexes may be set based on first information on distribution of each of the plurality of external objects and second information on height of each of the plurality of external objects.

According to an example embodiment, a method of operating an electronic device may comprise: identifying, a location of the electronic device as a first location, through at least one communication circuit, based on execution of an application; identifying at least one index for recognizing at least one external object located within a designated distance from the first location among a plurality of external objects, among a plurality of indexes for recognizing the plurality of external objects comprised in a digital map; identifying whether the at least one index satisfies a designated condition set based on the application; displaying, a visual affordance for guiding to obtain an image including at least one visual object corresponding to at least in part of the at least one external object through a display, based on the at least one index satisfying the designated condition; and after displaying the visual affordance, adjusting the location of the electronic device from the first location to a second location based on the image including the at least one visual object, obtained through a camera, wherein each of the plurality of indexes may be set based on first information on distribution of each of the plurality of external objects and second information on height of each of the plurality of external objects.

According to an example embodiment, a non-transitory computer readable storage medium may store one or more programs comprising instructions which, when executed by at least one processor, individually and/or collectively, of an electronic device with a camera, a display, and at least one communication circuit, cause the electronic device to: identify, through the at least one communication circuit, a location of the electronic device as a first location, based on execution of an application; identify at least one index for recognizing at least one external object located within a designated distance from the first location among a plurality of external objects, among a plurality of indexes for recognizing the plurality of external objects comprised in a digital map; identify whether the at least one index satisfies a designated condition set based on the application; display, through the display, a visual affordance for guiding to obtain an image including at least one visual object corresponding to at least in part of the at least one external object, based on the at least one index satisfying the designated condition; and after displaying the visual affordance, adjust the location of the electronic device from the first location to a second location based on the image including the at least one visual object, obtained through the camera, wherein each of the plurality of indexes may be set based on first information on distribution of each of the plurality of external objects and second information on height of each of the plurality of external objects.

An electronic device according to an example embodiment can identify a location of the electronic device as a first location. The electronic device can display a visual affordance for guiding to obtain an image including at least one visual object through a camera, based on at least one index for recognizing at least one external object located within a designated distance from the first location.

According to an example embodiment, when high location accuracy is required, the electronic device can perform a VPS or provide an affordance for guiding performance of the VPS. According to an example embodiment, in case that the VPS is performed only when high location accuracy is required, user convenience can be increased.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
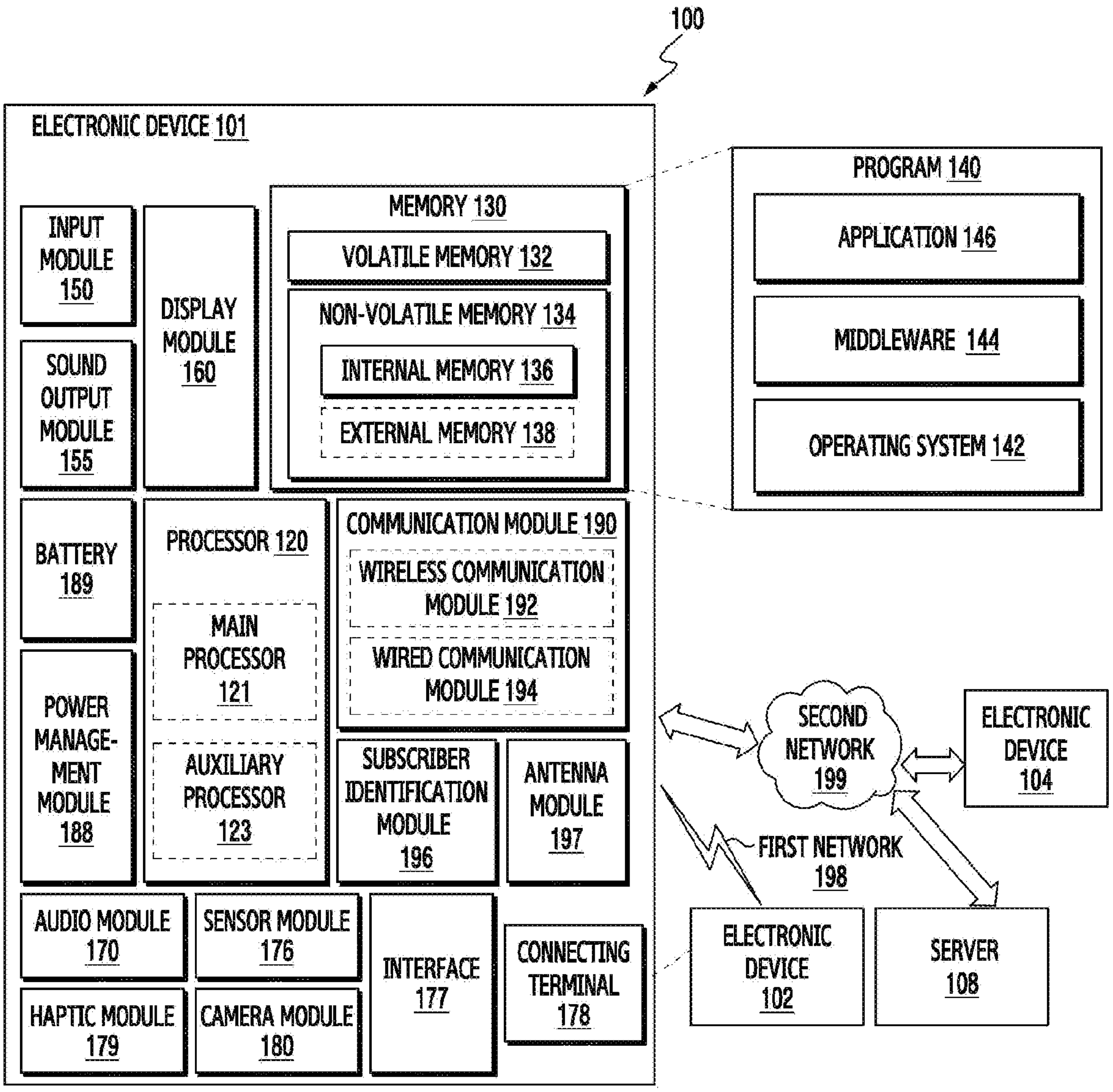
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, a processor (e.g., a processor 120 of FIG. 1) of an electronic device (e.g., an electronic device 101 of FIG. 1) may, individually and/or collectively, identify a location of the electronic device through at least one communication circuit (e.g., a global positioning system (GPS) receiver). The location of the electronic device identified through the at least one communication circuit may be inaccurate. For example, according to a surrounding environment, accuracy of the location of the electronic device identified through the at least one communication circuit may be decreased. The processor may identify the exact location of the electronic device through a visual positioning service (or visual positioning system) (VPS).

An operation of an electronic device (or a processor of the electronic device) for the above-described embodiment may be described below. An electronic device described below may correspond to the electronic device 101 of FIG. 1. A server described below may correspond to a server 108 of FIG. 1.

Figure 2:
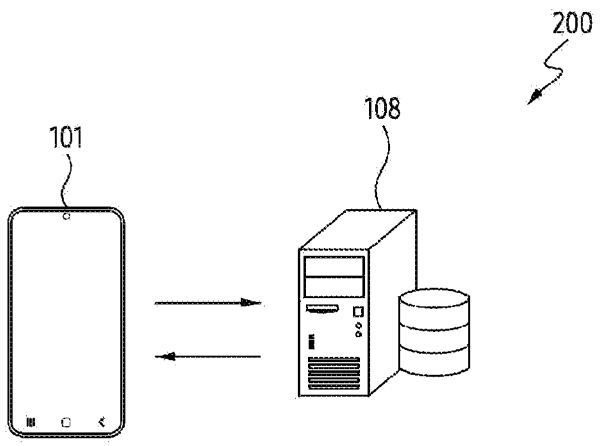
FIG. 2 is a diagram illustrating an environment including an electronic device and a server for a VPS according to various embodiments.

FIG. 2 is a diagram illustrating an environment including an electronic device and a server for a VPS according to various embodiments.

Referring to FIG. 2, in an environment 200, an electronic device 101 and a server 108 may be used to perform the VPS.

According to an embodiment, the electronic device 101 may perform the VPS through the server 108. Hereinafter, an example in which the electronic device 101 performs the VPS may be described.

According to an embodiment, the electronic device 101 may identify (or scan) surroundings of a user of the electronic device 101 through a camera. The electronic device 101 may identify a location of the electronic device 101 through at least one communication circuit (e.g., a GPS receiver). The electronic device 101 may transmit information on images identified through the camera at the identified location to the server 108. Based on transmitting information on the identified images, the electronic device 101 may receive information on the location of the electronic device 101 (e.g., information on latitude and longitude) and three-dimensional (3D) data (or 3D map data) corresponding to the location of the electronic device 101. The electronic device 101 may identify a location of the camera and a photographing direction of the camera, based on the 3D data. The electronic device 101 may obtain (or generate) a 2D object related to a service performed through an application executed in the electronic device 101 based on the 3D data. For example, the electronic device 101 may obtain (or generate) the 2D object by rendering an augmented reality (AR) object. The electronic device 101 may display the obtained 2D object on a display superimposed on the image obtained through the camera.

According to an embodiment, the server 108 may include visual data of an external environment of the electronic device 101. The visual data may be configured in a text or binary form including data capable of configuring a 3D view, such as shape (SHP) or GeoJSON format. For example, the server 108 may include visual data of an urban environment. The visual data of the urban environment may include data capable of identifying (or estimating) a height or number of floors of a building. For example, the server 108 may include (or store) 3D data (or 3D map data) corresponding to an external environment.

FIG. 2 illustrates an example in which the electronic device 101 performs VPS through information (e.g., 3D data) received through the server 108, but it is not limited thereto. The electronic device 101 may perform at least part of functions of the server 108. For example, the electronic device 101 may store at least a part or all of information stored in the server 108. The electronic device 101 may independently perform VPS by performing at least a part of functions of the server 108.

Figure 3A:
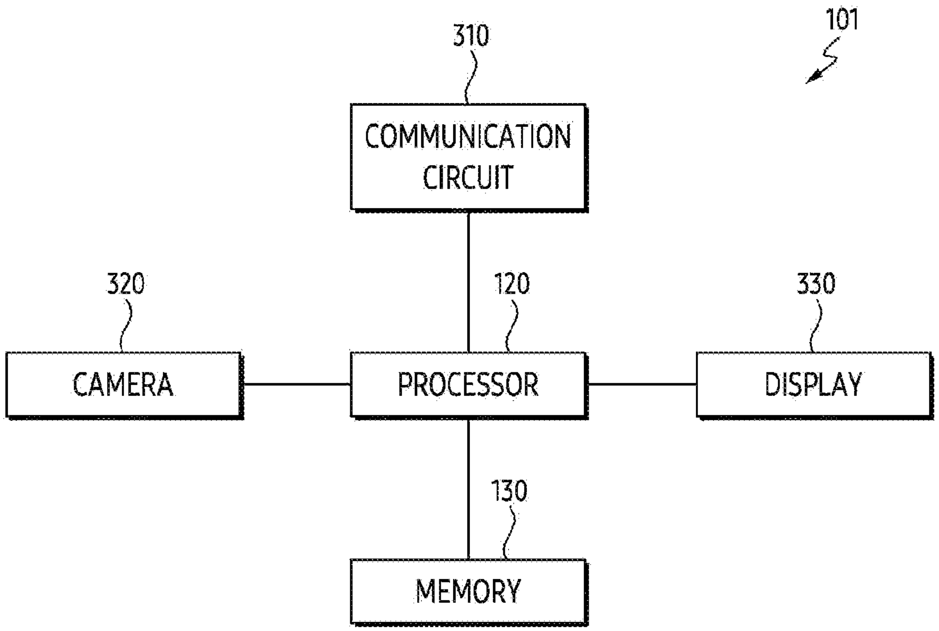
FIG. 3A is a block diagram illustrating an example configuration of an electronic device according to various embodiments.

FIG. 3A is a block diagram illustrating an example configuration of an electronic device according to various embodiments.

Referring to FIG. 3A, an electronic device 101 of FIG. 3A may at least partially correspond to the electronic device 101 of FIG. 2. The electronic device 101 may include a processor (e.g., including processing circuitry) 120, a memory 130, a communication circuit 310, a camera 320, and/or a display 330. According to an embodiment, the electronic device 101 may include at least one of the processor 120, the memory 130, the communication circuit 310, the camera 320, and the display 330. For example, at least a part of the processor 120, the memory 130, the communication circuit 310, the camera 320, and the display 330 may be omitted according to an embodiment.

According to an embodiment, the processor 120 may correspond to at least a part of the processor 120 of FIG. 1. The processor 120 may be operably coupled with or connected with the memory 130, the communication circuit 310, the camera 320, and the display 330.

According to an embodiment, the processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may, for example, control the memory 130, the communication circuit 310, the camera 320, and the display 330. The memory 130, the communication circuit 310, the camera 320, and the display 330 may be controlled by the processor 120. For example, the processor 120 may obtain information stored in the memory 130. The processor 120 may identify information stored in the memory 130. For another example, the processor 120 may establish a connection with an external electronic device (e.g., the server 108 of FIG. 2) through the communication circuit 310 and perform communication.

According to an embodiment, the processor 120 may include a hardware component for processing data based on one or more instructions. The hardware component for processing data may include, for example, an arithmetic and logic unit (ALU), a field programmable gate array (FPGA), and/or a central processing unit (CPU). The processor 120 may be configured with at least one processor.

According to an embodiment, the memory 130 may be used to store information or data. For example, the memory 130 may at least partially correspond to the memory 130 of FIG. 1. For example, the memory 130 may be used to store data obtained from a server (e.g., the server 108 of FIG. 2). For example, the memory 130 may be a volatile memory unit or units. The memory 130 may be a nonvolatile memory unit or units. For another example, memory 130 may be another type of computer-readable medium, such as a magnetic or optical disk.

According to an embodiment, one or more instructions indicating an operation to be performed by the processor 120 may be stored in the memory 120. Hereinafter, a set of one or more instructions may be referred to as a firmware, an operating system, a process, a routine, a sub-routine and/or an application. For example, the processor 120 may operate by executing a set of a plurality of instructions distributed in a form of an application.

According to an embodiment, the memory 130 may be used to store various applications. For example, the memory 130 may be used to store an application for providing a service to a user based on a location.

According to an embodiment, the communication circuit 320 may at least partially correspond to a communication module 190 of FIG. 1. For example, the communication circuit 320 may be used for various radio access technologies (RATs). For example, the communication circuit 430 may include at least one communication circuit.

For example, the communication circuit 320 may include a GPS receiver. The GPS receiver may at least partially correspond to a GNSS communication module, which is an example of a wireless communication module 192 of FIG. 1. The GPS receiver may be used to receive a GPS signal. The GPS may alternatively or additionally include a receiver for receiving a signal of at least one (e.g., at least one of GLObal NAvigation Satellite System (GLONASS), Beidou Navigation Satellite System (hereinafter, "Beidou"), quasi-zenith satellite system (QZSS), Indian reginal satellite system (IRNSS) or the European global satellite-based navigation system (Galileo)) of a global navigation satellite system (GNSS) according to at least one of a usage area or bandwidth, and may receive information on a location of the electronic device 101 based in that. The processor 120 may obtain (or receive) information on the location of the electronic device 101 using the GPS receiver.

According to an embodiment, the communication circuit 320 may be used to perform cellular communication or wireless local area network (WLAN) communication. For example, the processor 120 may communicate with an external electronic device (e.g., the server 108 of FIG. 2) through the cellular communication or the WLAN communication. For example, the processor 120 may obtain (or receive) information on the location of the electronic device 101 through the cellular communication or the WLAN communication.

According to an embodiment, the camera 320 may include one or more optical sensors (e.g., a charged coupled device (CCD) sensor, a complementary metal oxide semiconductor (CMOS) sensor) that generate an electrical signal representing a color and/or brightness of light. A plurality of optical sensors included in the camera 320 may be arranged in a form of a 2-dimensional array. The camera 320 may correspond to light reaching the optical sensors of the 2-dimensional array by substantially simultaneously obtaining (or identifying) electrical signals of each of the plurality of optical sensors, and generate an image including a plurality of pixels arranged in 2-dimensions. For example, photo data (and/or photo) captured using the camera 320 may refer to an image obtained (or identified) from the camera 320. For example, video data captured using the camera 320 may refer to a sequence of a plurality of images obtained (or generated) according to a designated frame rate from the camera 320. For example, the camera 320 may at least partially correspond to the camera module 180 of FIG. 1.

According to an embodiment, the electronic device 101 may further include a flashlight disposed in a direction in which the camera 320 receives light, for outputting light in the direction. According to an embodiment, the display 330 may be used to display various screens.

For example, the display 330 may be used to output content, data, or signals through a screen. The display 330 may output visualized information to the user. The visualized information may be generated by an application. For example, the display 330 may output visualized information to the user by being controlled by a controller such as a graphic processing unit (GPU) included in the processor 120 or disposed within the electronic device 101 independently of the processor 120. The display 330 may include, for example, and without limitation, a flat panel display (FPD) and/or an electronic paper. The FPD may include a liquid crystal display (LCD), a plasma display panel (PDP), and/or one or more light emitting diode (LED). The LED may include an organic LED (OLED). For example, the display 330 may at least partially correspond to the display module 160 of FIG. 1.

For example, the display 330 may be used to display an image obtained (or identified) through the camera 320. The processor 120 may obtain an image including a visual object corresponding to at least one external object (or at least a part of the at least one external object) through the camera 320. The processor 120 may display the obtained image through the display 330.

Although not shown, according to an embodiment, the electronic device 101 may include at least one sensor. For example, the at least one sensor may at least partially correspond to a sensor module 176 of FIG. 1.

According to an embodiment, the at least one sensor may be used to identify information on the location of the electronic device 101 or information on movement of the electronic device 101. For example, the at least one sensor may include an acceleration sensor, a gyro sensor, or a magnetometer. The acceleration sensor may identify (or measure, detect) acceleration of the electronic device 101 in three directions of x-axis, y-axis, and z-axis. The gyro sensor may identify (or measure, detect) an angular velocity of the electronic device 101 in three directions of the x-axis, y-axis, and z-axis. The magnetic field may detect magnitude of a magnetic field.

Figure 3B:
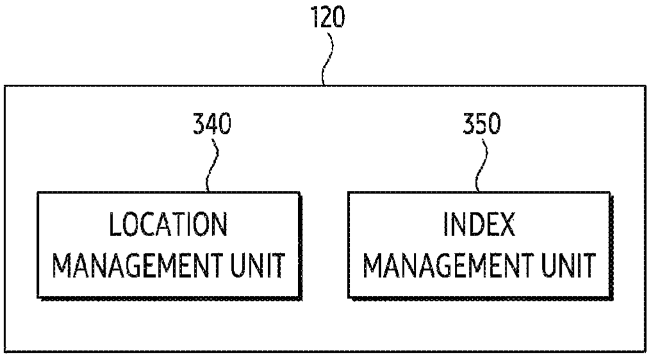
FIG. 3B is a block diagram illustrating an example configuration of a processor included in an electronic device according to various embodiments.

FIG. 3B is a block diagram illustrating an example configuration of a portion of a processor included in an electronic device according to various embodiments.

Referring to FIG. 3B, the processor 120 may include a location management unit 340 and/or an index management unit 350, each of which may include various circuitry and/or executable program instructions.

According to an embodiment, the location management unit 340 may be included in a framework layer of an operating system (OS) of the electronic device 101. The location management unit 340 may receive (or obtain) information on a location of the electronic device 101 through a communication circuit 310 (e.g., the GPS receiver). The location management unit 340 may transmit the received information on the location of the electronic device 101 to a server (e.g., the server 108 of FIG. 2) through the communication circuit 310.

According to an embodiment, the index management unit 350 may identify and manage at least one index for recognizing at least one external object. For example, the index management unit 350 may receive information on at least one index from a server (e.g., the server 108 of FIG. 2). For another example, the index management unit 350 may identify information on at least one index from the memory 130.

For example, the index management unit 350 may identify whether at least one index satisfies a designated condition set based on an application. The index management unit 350 may perform VPS based on that the at least one index satisfies the designated condition. Based on that the at least one index satisfies the designated condition, the index management unit 350 may display a visual affordance for guiding to obtain an image including at least one visual object corresponding to at least a part of at least one external object.

Figure 4:
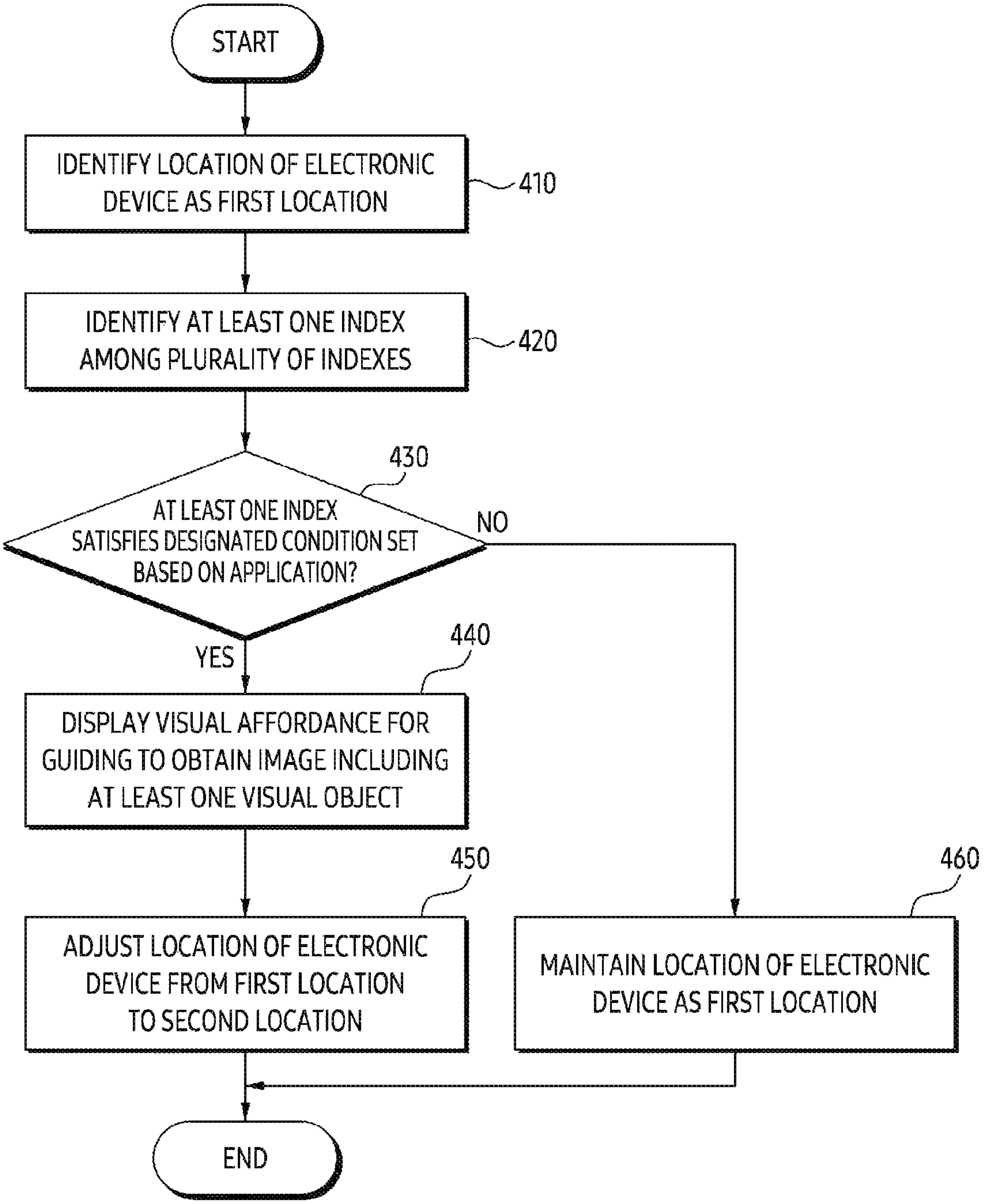
FIG. 4 is a flowchart illustrating an example operation of an electronic device according to various embodiments.

FIG. 4 is a flowchart illustrating an example operation of an electronic device according to various embodiments. This method may be executed by the electronic device 101 and the processor 120 of the electronic device 101 shown in FIGS. 2 and 3.

Referring to FIG. 4, in operation 410, the processor 120 may identify a location of the electronic device 101 as a first location. For example, the processor 120 may identify the location of the electronic device 101 as the first location through at least one communication circuit (e.g., the communication circuit 310 of FIG. 3) based on execution of an application.

According to an embodiment, the processor 120 may execute an application. For example, the processor 120 may execute an application for providing a service to a user based on a location in response to the user's input. For example, the application for providing a service to a user based on a location may include an augmented reality (AR) application, a map application, a navigation application, or a camera application.

According to an embodiment, the processor 120 may identify a location of the electronic device 101 as a first location through at least one communication circuit. For example, the processor 120 may receive at least one GPS signal through a GPS receiver. The processor 120 may identify the location of the electronic device 101 as the first location based on received at least one GPS signal. For another example, the processor 120 may communicate with at least one base station performing cellular communication. The processor 120 may identify the location of the electronic device 101 based on at least one signal transmitted and received with at least one base station. The processor 120 may identify the location of the electronic device 101 as the first location, by identifying an angle of flight (AoA), time of flight (ToF), or time difference of arrival (TDoA) based on at least one signal. For another example, the processor 120 may be connected to at least one access point (AP) performing WLAN communication. The processor 120 may receive information on a location of at least one AP performing communication. The processor 120 may identify the location of the electronic device 101 as the first location based on the information on the location of the AP.

According to an embodiment, an error may occur in the location of the electronic device 101 identified through at least one communication circuit. The first location identified through at least one communication circuit may be distinguished from an actual location of the electronic device 101.

In operation 420, the processor 120 may identify at least one of a plurality of indexes. For example, the processor 120 may identify at least one index for recognizing at least one external object located within a designated distance from the first location among a plurality of external objects, among a plurality of indexes for recognizing the plurality of external objects included in a digital map.

According to an embodiment, the plurality of indexes may be included in a digital map. For example, the digital map may include a plurality of areas configured based on a range of the plurality of indexes. For example, the plurality of indexes may be used to recognize the plurality of external objects. The plurality of external objects may include buildings located in a geographic area corresponding to an area displayed on the digital map. The plurality of external objects may include at least one external object. At least one external object may be located within a designated distance from the first location.

For example, each of the plurality of indexes may be set based on first information on distribution of each of the plurality of external objects and second information on height of each of the plurality of external objects. An example in which each of the plurality of indexes is set based on first information on the distribution of each of the plurality of external objects and second information on the height of each of the plurality of external objects will be described later.

According to an embodiment, the designated distance may be identified based on accuracy of the first location. For example, the processor 120 may receive first data (e.g., GPS data) for identifying the location of the electronic device 101 as the first location and second data (e.g., GPS horizontal error) for an error of the first data, through at least one communication circuit. The processor 120 may identify the designated distance based on the second data. For example, the processor 120 may set the designated distance to be larger, as error of the first data increases. The processor 120 may set the designated distance to be smaller, as the error of the first data is smaller. The processor 120 may set the designated distance to be larger as accuracy of the first location identified as the location of the electronic device 101 is lower. The processor 120 may set the designated distance to be smaller as the accuracy of the first location identified as the location of the electronic device 101 is higher.

In operation 430, the processor 120 may identify whether at least one index satisfies a designated condition set based on an application.

According to an embodiment, the plurality of indexes may be related to complexity of a surrounding environment. As the surrounding environment becomes more complex, accuracy of the first location, which is a location of the electronic device 101 identified through the communication circuit of the electronic device 101, may decrease. Accordingly, the processor 120 may identify at least one index for recognizing at least one external object located within a designated distance from the first location. For example, as an average of the at least one index increases, accuracy of a location (e.g., the first location) of the electronic device 101 identified through the communication circuit may decrease.

According to an embodiment, the processor 120 may identify information on accuracy of a location of the electronic device 101 required to execute an application. Accuracy of a location of the electronic device 101 required according to an application may be set differently. For example, accuracy of the location of the electronic device 101 required by a map application may be set lower than accuracy of the location of the electronic device 101 required by an AR application. The processor 120 may set a designated condition based on information on the accuracy of the location of the electronic device 101. When the map application is executed, a first designated condition may be set. When the AR application is executed, a second designated condition may be set.

According to an embodiment, each of the plurality of indexes may be set within a designated range of values. For example, the processor 120 may identify an average of the at least one index. The processor 120 may identify whether the average of the at least one index is greater than or equal to a value set as a designated condition. For another example, the processor 120 may identify a mode of the at least one index. The processor 120 may identify whether the mode of the at least one index is greater than or equal to a value set as a designated condition. For another example, the processor 120 may identify a median of the at least one index. The processor 120 may identify whether the median of the at least one index is greater than or equal to a value set as a designated condition. For another example, the processor 120 may identify a maximum value or a minimum value of the at least one index. The processor 120 may identify whether maximum or minimum value of the at least one index is greater than or equal to a value set as a designated condition.

For example, the value set as the designated condition may be set based on a type of the application. For example, the value set as the designated condition may be set differently according to whether the application is the AR application.

In operation 440, when at least one index satisfies a designated condition (430—Yes), the processor 120 may display a visual affordance for guiding to obtain (or identify) an image including at least one visual object. Based on identifying that the at least one index satisfies the designated condition, the processor 120 may display the visual affordance for guiding to obtain the image including at least one visual object. For example, based on identifying that the at least one index satisfies the designated condition, the processor 120 may display the visual affordance for guiding to obtain the image including at least one visual object corresponding to at least a part of the at least one external object through a display (e.g., the display 330 of FIG. 3) of the electronic device 101.

According to an embodiment, the at least one visual object may correspond to at least a part of the at least one external object. The at least a part of the at least one external object may include at least one subject capable of being photographed through a camera (e.g., the camera 320 of FIG. 3) of the electronic device 101. For example, the processor 120 may display the visual affordance for guiding to obtain the image including at least one visual object corresponding to at least one subject.

For example, the processor 120 may superimpose and display the visual affordance on an execution screen of the application. The processor 120 may guide a user to obtain the image including at least one visual object through a camera, by superimposing and displaying the visual affordance on the execution screen of the application.

In operation 450, the processor 120 may adjust the location of the electronic device from the first location to a second location. For example, after displaying the visual affordance, the processor 120 may adjust the location of the electronic device 101 from the first location to the second location, based on the image including at least one visual object, obtained through the camera.

According to an embodiment, the processor 120 may obtain the image including at least one visual object through the camera. The processor 120 may receive a user input for obtaining the image including at least one visual object. The processor 120 may obtain the image including at least one object through the camera based on the received user input.

According to an embodiment, the processor 120 may transmit information on the obtained image through the camera to a server (e.g., the server 108 of FIG. 3). For example, the processor 120 may transmit the obtained image to the server. For another example, the processor 120 may identify a binary code for the at least one visual object, based on the obtained image. The processor 120 may transmit the identified binary code to the server.

The processor 120 may receive information on the location of the electronic device 101 based on transmitting information on the image to the server. The processor 120 may identify the location of the electronic device 101 as the second location, based on the information on the location of the electronic device 101. The processor 120 may adjust the location of the electronic device 101 from the first location to the second location. The processor 120 may correct the location of the electronic device 101 to the second location.

In operation 460, when the at least one index does not satisfy the designated condition (430—No), the processor 120 may maintain the location of the electronic device 101 as the first location. Based on identifying that the at least one index is distinct from the designated condition, the processor 120 may maintain the location of the electronic device 101 as the first location. The processor 120 may maintain the location of the electronic device 101 required to execute the application as the first location. The processor 120 may set the location of the electronic device 101 as the first location and transfer (or transmit) to the application. For example, the processor 120 may display a screen (or an execution screen) for executing an application including an element for indicating the first location through a display.

In operations 410 to 460, a processor of the server 108 may receive information on the location of the electronic device 101 from the electronic device 101. The processor of the server 108 may identify information on the at least one index. The server 108 may store a digital map including a plurality of indexes for recognizing a plurality of external objects. The processor of the server 108 may identify the at least one index for recognizing at least one external object located within a designated distance from the first location among a plurality of external objects, based on information on the location of the electronic device 101. The processor of the server 108 may transmit information on the at least one index to the electronic device 101.

Thereafter, the processor of the server 108 may receive information on the image from the electronic device 101. For example, the processor of the server 108 may identify a binary code for the at least one visual object by receiving information on the image. The processor of the server 108 may identify the location of the electronic device 101 by comparing the binary code for the at least one visual object and a 3D map. In addition, the processor of server 108 may identify 3D data corresponding to the location of the electronic device 101. The processor of server 108 may transmit information on the location of the electronic device 101 and 3D data corresponding to the location of the electronic device 101 to the electronic device 101.

Figure 5:
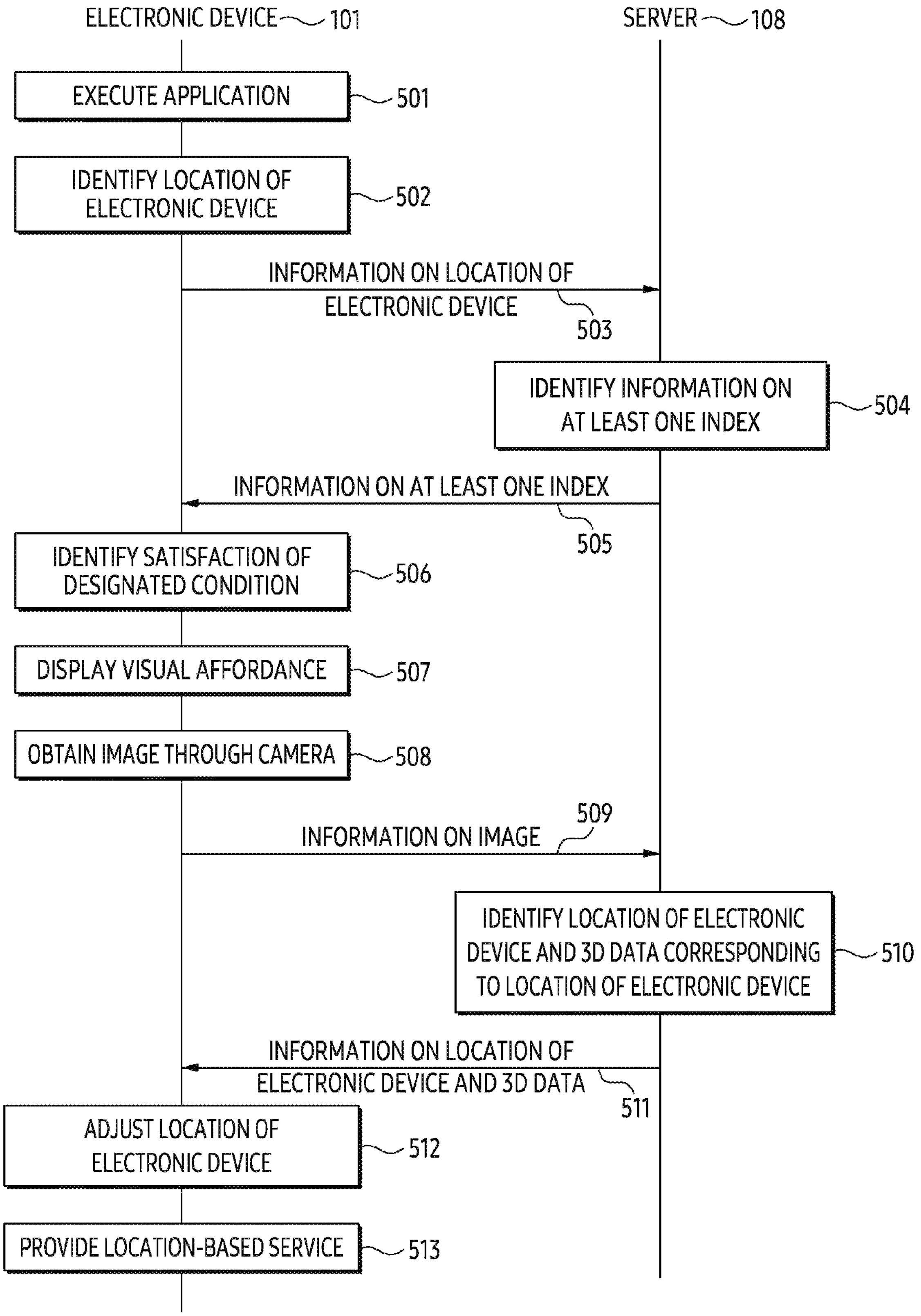
FIG. 5 is a signal flow diagram illustrating an example operation of an electronic device and a server according to various embodiments.

FIG. 5 is a signal flow diagram illustrating an example operation of an electronic device and a server according to various embodiments.

Referring to FIG. 5, in operation 501, a processor 120 may execute an application. The processor 120 may obtain (or identify) a user input for execution of the application from a user. The processor 120 may execute the application based on a user input. For example, the processor 120 may execute an application for providing a service based on the user's location.

In operation 502, the processor 120 may identify the location of the electronic device 101 based on the execution of the application. The processor 120 may identify the location of the electronic device 101 as the first location using at least one communication circuit.

In operation 503, the processor 120 may transmit information on the location of the electronic device 101 to the server 108. The server 108 (or a processor of the server 108) may receive information on the location of the electronic device 101. The information on the location of the electronic device 101 may include information for indicating that the electronic device 101 is in the first location. The processor 120 may request information on the at least one index together with information on the location of the electronic device 101 from the server 108.

In operation 504, the server 108 may store a digital map including a plurality of indexes for recognizing a plurality of external objects. The server 108 may identify the at least one index for recognizing at least one external object located within a designated distance from the first location among a plurality of external objects, based on information on the location of the electronic device 101.

In operation 505, the server 108 may transmit information on the at least one index to the electronic device 101. The processor 120 may receive information on the at least one index from the server 108. The processor 120 may identify the at least one index for recognizing at least one external object located within a designated distance from the first location among the plurality of external objects, among the plurality of indexes, based on information on the at least one index.

According to an embodiment, the electronic device 101 may store at least a part of a digital map including a plurality of indexes included in the server 108. The electronic device 101 may store a part of the digital map for an area including a designated distance from the first location. When the at least a part of the digital map including the plurality of indexes is stored in the electronic device 101, operations 503 to 505 may be omitted. The processor 120 may not transmit information on the location of the electronic device 101 to the server 108, and identify at least one index for recognizing at least one external object among a plurality of indexes based on at least a part of a digital map stored in a memory (or cache) of the electronic device 101.

In operation 506, the processor 120 may identify that at least one index satisfies a designated condition. The processor 120 may set a designated condition based on accuracy of the location of the electronic device 101 required by the executed application. For example, the processor 120 may identify that average of at least one index is greater than or equal to the designated value.

In operation 507, the processor 120 may display a visual affordance based on identifying that at least one index satisfies a designated condition. For example, the processor 120 may display a visual affordance for guiding to obtain an image including at least one visual object corresponding to at least a part of at least one external object through the display. For example, based on identifying that at least one index satisfies a designated condition, the processor 120 may display a visual affordance superimposed on a screen for executing the application.

In operation 508, the processor 120 may obtain an image through a camera of the electronic device 101. The processor 120 may obtain an image including at least one visual object through the camera of the electronic device 101. The processor 120 may identify a user input for obtaining an image. The processor 120 may obtain an image including at least one visual object, based on a user input. For example, the processor 120 may obtain (or identify) a preview image obtained through the camera.

In operation 509, the processor 120 may transmit information on an image to the server 108. The server 108 may receive information on an image from the electronic device 101. For example, the processor 120 may transmit an image including at least one visual object to the server 108. For another example, the processor 120 may transmit a binary code for at least one visual object in the image.

In operation 510, the server 108 may identify the location of the electronic device 101 and 3D data corresponding to the location of the electronic device 101, based on information on an image received from the electronic device 101. For example, the server 108 may identify a binary code for at least one visual object based on an image received from the electronic device 101. For another example, the server 108 may identify a binary code for at least one visual object, by receiving the binary code for the at least one visual object from the electronic device 101.

The server 108 may identify the location of the electronic device 101 by comparing a binary code for at least one visual object with a 3D map. In addition, the server 108 may identify 3D data corresponding to the location of the electronic device 101.

For example, a digital map and a 3D map including a plurality of indexes may be distinguished from each other. The digital map may be used to indicate a plurality of indexes for recognizing a plurality of external objects. The 3D map may be used to indicate a 3-dimensional virtual space corresponding to an actual environment. According to an embodiment, the digital map and the 3D map may be formed as a single map.

In operation 511, the server 108 may transmit information on the location of the electronic device 101 and 3D data corresponding to the location of the electronic device 101 to the electronic device 101. The processor 120 may receive information on the location of the electronic device 101 and 3D data corresponding to the location of the electronic device 101 from the server 108. For example, the server 108 may identify the location of the electronic device 101 as a second location. The server 108 may transmit 3D data corresponding to the second location to the electronic device 101.

According to an embodiment, the electronic device 101 may store at least a part of a 3D map included (or stored) in the server 108. The electronic device 101 may store at least a part of the 3D map corresponding to the location of the electronic device 101. When at least a part of the 3D map is stored in the electronic device 101 (or a memory of the electronic device 101), operations 509 to 511 may be omitted. The processor 120 may not transmit information on an image obtained through the camera to the server 108, and identify the location of the electronic device 101 and 3D data corresponding to the location of the electronic device 101 based on at least a part of the 3D map stored in the memory (or cache) of the electronic device 101.

In operation 512, the processor 120 may adjust the location of the electronic device 101. For example, the processor 120 may adjust the location of the electronic device 101 from the first location to the second location. The processor 120 may calibrate the location of the electronic device 101 from the first location to the second location.

In operation 513, the processor 120 may provide a location-based service. The processor 120 may provide the location-based service through the application. The processor 120 may provide information indicating that the location of the electronic device 101 is the second location to the application. The processor 120 may provide the location-based service through the application, based on the second location. For example, the location-based service may include an AR service, a location-based advertising service, a building recognition service, a navigation service, an emergency service, and/or a game service.

According to an embodiment, the processor 120 may cease displaying the visual affordance based on receiving the 3D data from the server 108. The processor 120 may display a 2D object obtained (or identified) based on the second location and the 3D data, superimposed on an image including the at least one visual object.

For example, the processor 120 may identify a gaze direction in the 3D data, based on the second location and the 3D data. As an example, the processor 120 may compare an image including at least one visual object with 2D images obtainable (or identifiable) within the 3D data. The processor 120 may identify a 2D image most similar to the image including at least one visual object. The processor 120 may identify the gaze direction in the 3D data based on the identified 2D image. The processor 120 may identify a location of the camera (or a location of the electronic device 101), and a direction in which the camera faces (or a pose of the electronic device 101), based on the gaze direction in the 3D data.

The processor 120 may obtain a 2D object based on the 3D data. For example, the processor 120 may obtain the 2D object by rendering the 3D data. The processor 120 may display the obtained 2D object superimposed on an image including at least one visual object.

In FIGS. 6, 7, 8A and 8B below, a specific example in which a plurality of indexes are set within a digital map may be described.

Figure 6:
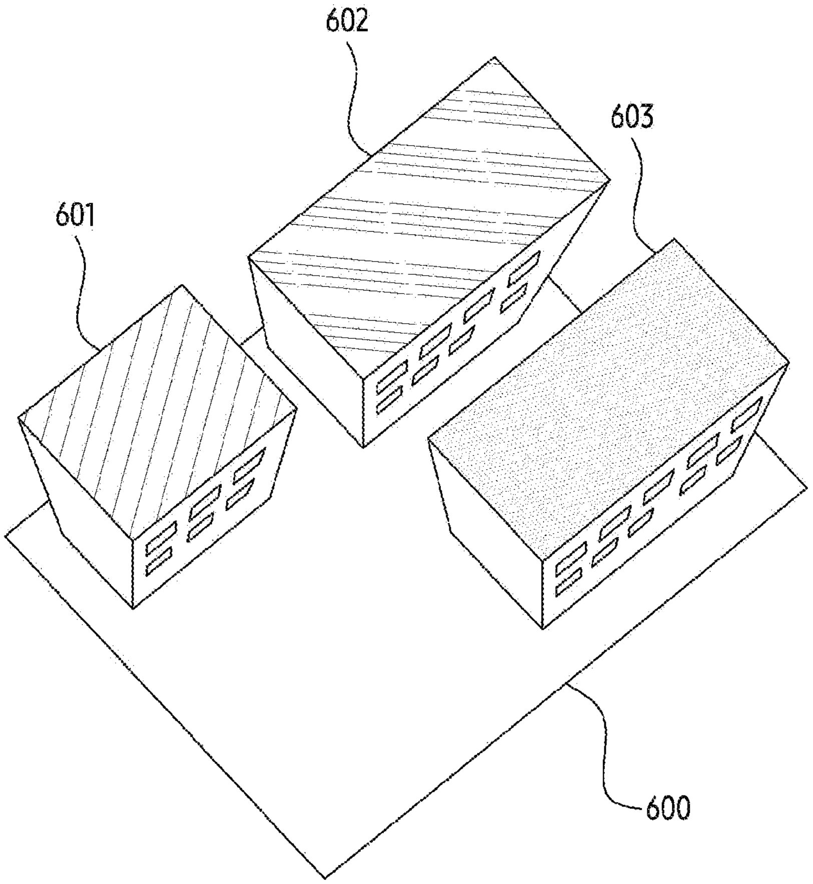
FIG. 6 is a diagram illustrating an example of identifying first information on a distribution of each of a plurality of external objects according to various embodiments.

FIG. 6 is a diagram illustrating an example of identifying first information on a distribution of each of a plurality of external objects according to various embodiments.

Figure 7:
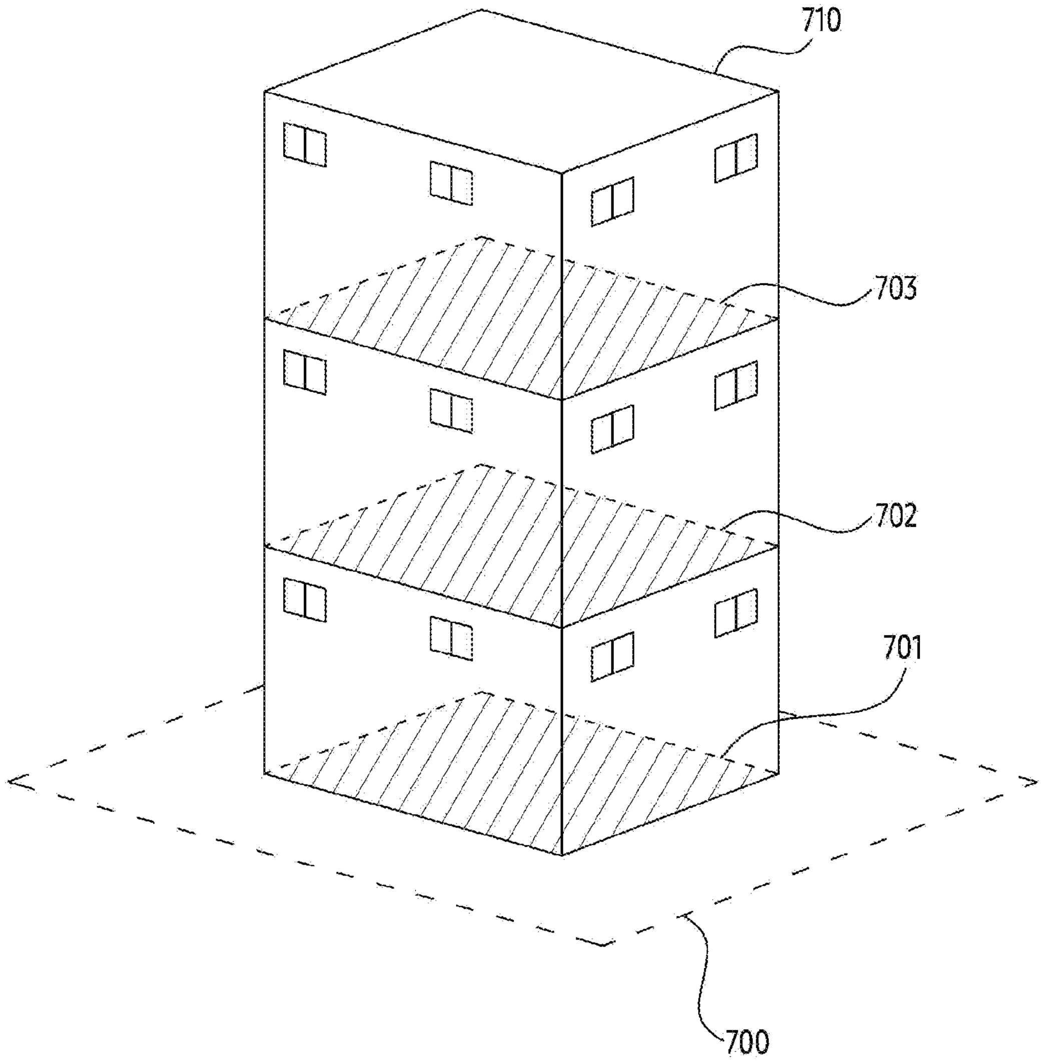
FIG. 7 is a diagram illustrating an example of identifying second information on a height of each of a plurality of external objects according to various embodiments.

FIG. 7 is a diagram illustrating an example of identifying second information on a height of each of a plurality of external objects according to various embodiments.

Figure 8A:
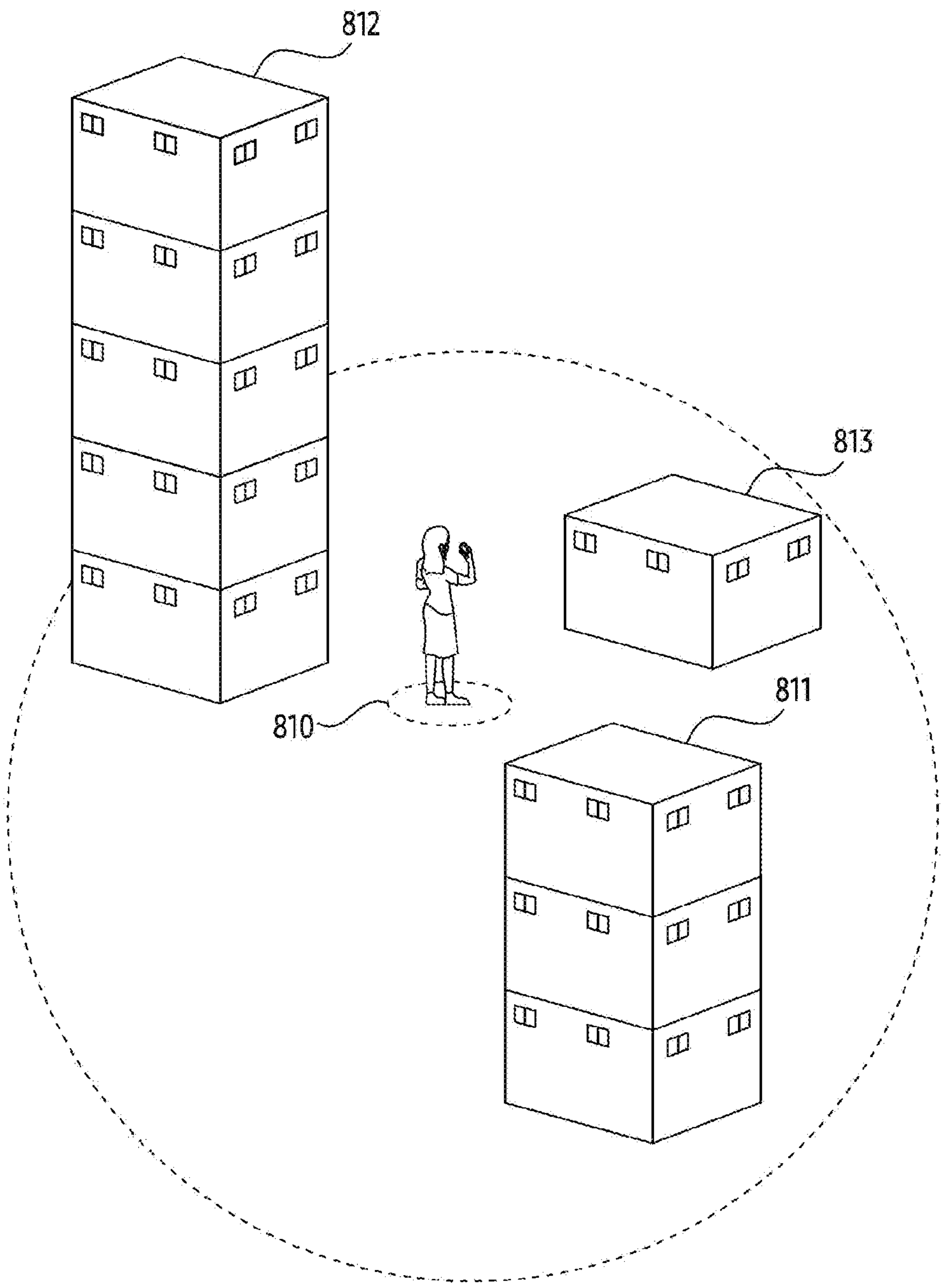
FIGS. 8A and 8B are diagrams illustrating another example of identifying second information on height of each of a plurality of external objects according to various embodiments.
Figure 8B:
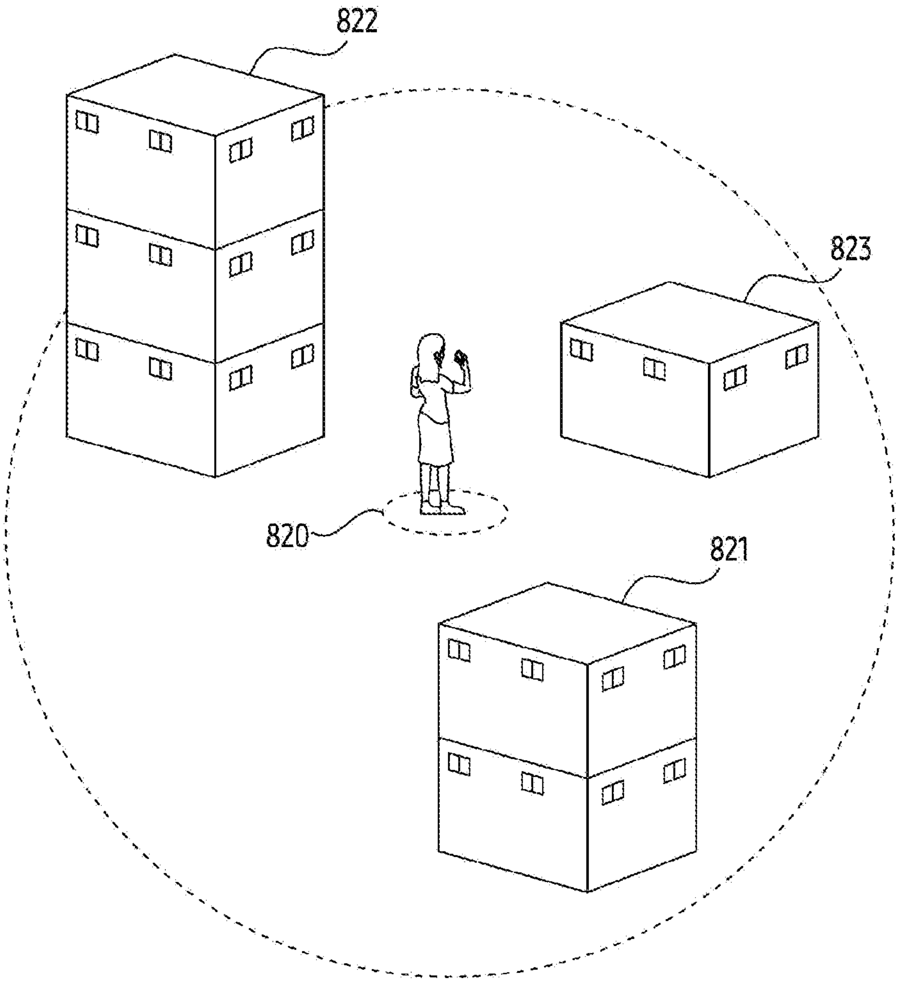

FIGS. 8A and 8B are diagrams illustrating another example of identifying second information on height of each of a plurality of external objects according to various embodiments.

Figure 9:
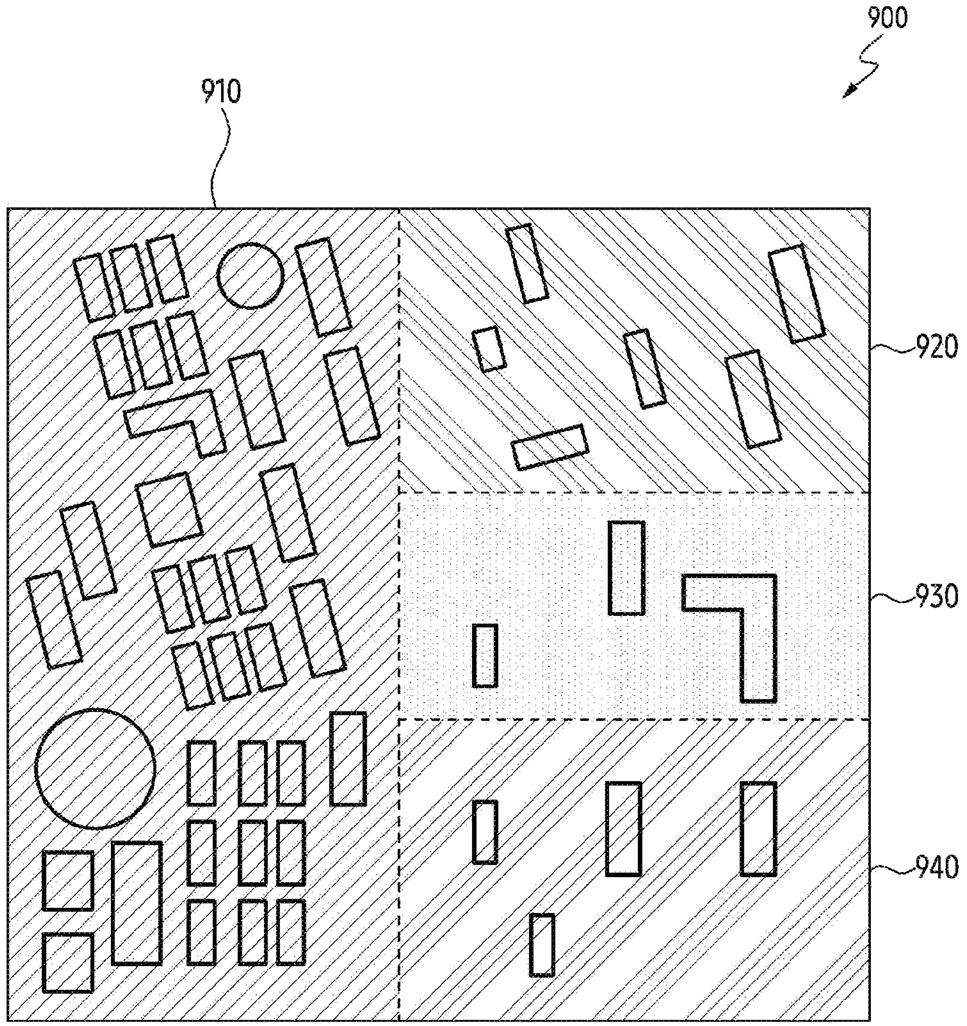
FIG. 9 is a diagram illustrating an example of a digital map including a plurality of indexes according to various embodiments.

FIG. 9 is a diagram illustrating an example of a digital map including a plurality of indexes according to various embodiments.

Referring to FIGS. 6, 7, 8A, 8B and 9, a plurality of indexes for recognizing a plurality of external objects may be included in a digital map. For example, each of the plurality of indexes may be set based on first information on distribution of each of the plurality of external objects and second information on height of each of the plurality of external objects. For example, the second information on the height of each of the plurality of external objects may include information on distribution of height of the plurality of external objects.

Each of a plurality of indexes in the digital map may be set through a processor 120 or a server 108 of an electronic device 101. Hereinafter, for convenience of description, each of the plurality of indexes in the digital map may be described as being set through the processor 120.

Referring to FIG. 6, the first information on distribution of each of a plurality of external objects may include information on density of a plurality of external objects (e.g., building). For example, the first information may include information on the density of a plurality of external objects. The plurality of external objects may include an external object 601, an external object 602, and an external object 603. The plurality of external objects may be located in an area 600. The density of the plurality of external objects may be identified through Equation 1.

$$M_u = \frac{S_B}{A_B} \qquad \text{[Equation 1]}$$

Referring to Equation 1, $M_U$ is density of a plurality of external objects. $A_B$ is an area of the area 600 in which the plurality of external objects are located. $S_B$ is an occupied area of the plurality of external objects. $S_B$ is the sum of the occupied area occupied by the external object 601, the external object 602, and the external object 603 within the area 600.

According to an embodiment, the processor 120 may obtain (or identify) a first value based on the first information on the distribution of each of the plurality of external objects. For example, the first value may include the density of the at least one external object located within a designated distance from a location of the electronic device 101.

Referring to FIG. 7, the second information on the height of each of the plurality of external objects may include information on floor area ratio of each of the plurality of external objects or information on average floor area ratio of the plurality of external objects.

Floor area ratio of a first external object 710 among the plurality of external objects may be calculated as a ratio of the sum of floor areas 701, 702 and 703 occupied by each layer of the first external object 710 with respect to an occupied area 700 occupied by the first external object 710.

The processor 120 may identify average floor area ratio per a designated area (e.g., a unit area). For example, the designated area may include an area set within a designated distance from the location of the electronic device 101. The processor 120 may identify average floor area ratio of at least one external object among a plurality of external objects located within the designated area for the designated area.

According to an embodiment, when a part of the external object 710 is included in the designated area, the processor 120 may identify the floor area ratio based on the part of the external object 710 included in the designated area.

According to an embodiment, the processor 120 may obtain a second value based on second information on height of each of a plurality of external objects. The second value may include average floor area ratio of the at least one external object located within a designated distance from the location of the electronic device 101.

Referring to FIGS. 8A and 8B, the information on height of each of the plurality of external objects may include information on distribution of height of the plurality of external objects. The information on the distribution of height of the plurality of external objects may include information on variance (or standard deviation) of height of the plurality of external objects.

According to an embodiment, the processor 120 may obtain a third value based on information on the distribution of height of the plurality of external objects. The third value may include a variance of height of the at least one external object located within a designated distance from the location of the electronic device 101.

According to an embodiment, the processor 120 may identify information on a volume of each of the plurality of external objects, based on information on the height of each of the plurality of external objects. The information on the volume of each of the plurality of external objects may include information on the variance (or standard deviation) of the volume of the plurality of external objects.

Referring to FIG. 8A, a first external object 811, a second external object 812, and a third external object 813 may be located within a designated distance from a location 810 of the electronic device 101. The processor 120 may identify variance of a volume occupied by the first external object 811 to a volume occupied by the third external object 813.

For example, an area occupied by the first external object 811 is 100 $m^2$. A height of the first external object 811 is 10 m. An area occupied by the second external object 812 is 100 m2. A height of the second external object 812 is 50 m. An area occupied by the third external object 813 is 50 m2. A height of the third external object 813 is 5 m. The processor 120 may identify variance of the volume occupied by the first external object 811 to the volume occupied by the third external object 813 as 4347222.

Referring to FIG. 8B, a first external object 821, a second external object 822, and a third external object 823 may be located within a designated distance from a location 820 of the electronic device 101. The processor 120 may identify variance of a volume occupied by the first external object 821 to a volume occupied by the third external object 823.

For example, an area occupied by the first external object 821 is 100 m2. A height of the first external object 821 is 10 m. An area occupied by the second external object 822 is 100 m2. A height of the second external object 822 is 15 m. An area occupied by the third external object 823 is 50 m2. A height of the third external object 823 is 2 m. The processor 120 may identify variance of the volume occupied by the first external object 821 to the volume occupied by the third external object 823 as 55555.

According to an embodiment, the processor 120 may obtain a fourth value based on information on variance of volume of a plurality of external objects. The fourth value may include variance of a volume of at least one external object located within a designated distance from the location of the electronic device 101.

Referring to FIGS. 6, 7, 8A and 8B, the processor 120 may obtain the first value based on the first information on variance of each of the plurality of external objects. The processor 120 may obtain the second value based on the second information on height of each of the plurality of external objects. The processor 120 may obtain the third value based on the information on distribution of heights of the plurality of external objects. The processor 120 may obtain the fourth value based on the information on distribution of volume of the plurality of external objects.

The processor 120 may identify a plurality of indexes (or at least one index) based on at least one of the first to fourth values. For example, the processor 120 may identify the plurality of indexes (or at least one index) based on the first to third values. The processor 120 may identify each of the plurality of indexes by applying different weights to the first to third values. For example, the processor 120 may set a weight of the first value to be the greatest. As an example, when heights of the plurality of external objects are constant, performance of a VPS may decrease compared to a case where the heights of the plurality of external objects are different from each other. Accordingly, the processor 120 may set a weight of the third value or the fourth value to be negative.

Referring to FIG. 9, the processor 120 may configure a plurality of indexes identified at each point through a digital map. A digital map 900 may indicate an example of some areas of the entire digital map. The digital map 900 may be configured with a plurality of areas configured based on a range of the plurality of indexes. For example, the digital map 900 may include an area 910, an area 920, an area 930, and an area 940. Areas 910 to 940 may be configured based on a range of the plurality of indexes. For example, an index at each point within the area 910 may be configured within a first range. An index at each point within the area 920 may be configured within a second range. An index at each point within the area 930 may be configured within a third range. An index at each point within the area 940 may be configured within a fourth range.

The digital map 900 of FIG. 9 may be an example of a digital map comprising a plurality of areas configured based on a range of the plurality of indexes. The digital map 900 of FIG. 9 is an example, and the digital map may be configured in various ways. For example, the digital map may be configured with a plurality of areas based on a grid shape. For another example, the digital map may be configured with a plurality of areas based on a contour shape.

Figure 10:
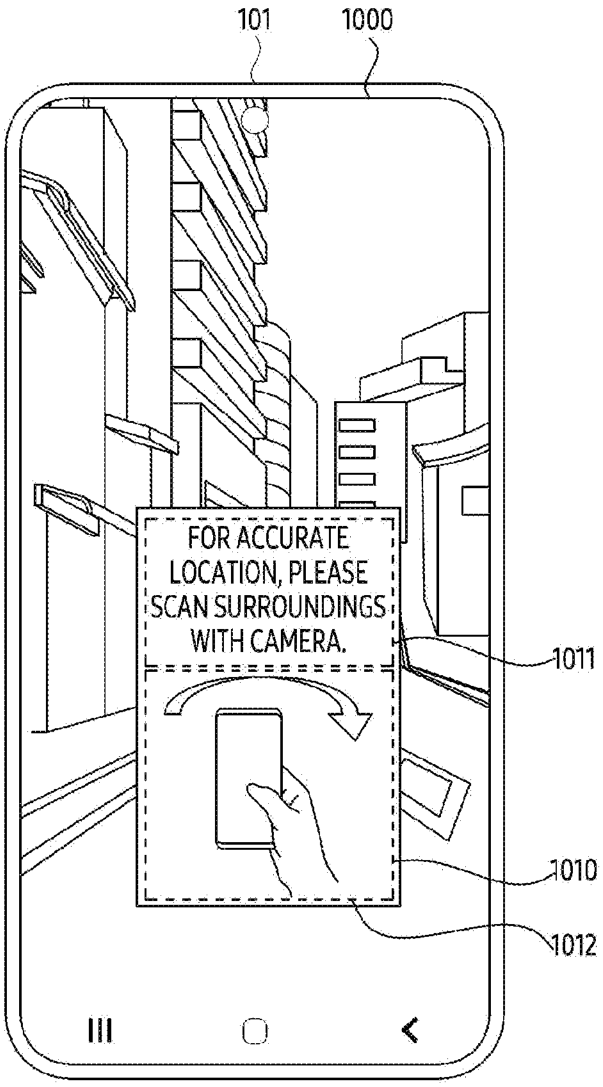
FIG. 10 is a diagram illustrating an example of a visual affordance displayed in an electronic device according to various embodiments.

FIG. 10 is a diagram illustrating an example of a visual affordance displayed in an electronic device according to various embodiments.

Referring to FIG. 10, a processor 120 may identify that at least one index satisfies a designated condition. The processor 120 may display a visual affordance 1012 for guiding to obtain an image including at least one visual object corresponding to at least a part of at least one external object.

According to an embodiment, the processor 120 may display a notification 1010 including the visual affordance 1012 on a display 330. For example, the processor 120 may display the notification 1010 superimposed on the screen 1000 for executing an application. For example, the screen 1000 may be a screen for executing an AR application.

For example, the notification 1010 may further include text 1011 for guiding to obtain an image including at least one visual object as well as the visual affordance 1012. The processor 120 may guide the user to obtain an image by displaying the notification 1010 including the text 1011 and the visual affordance 1012 on the screen 1000.

According to an embodiment, the processor 120 may receive a user input for obtaining an image including at least one visual object. The processor 120 may obtain an image including at least one object through a camera, based on the received user input. The processor 120 may cease displaying the visual affordance 1012 based on obtaining the image including at least one visual object. The processor 120 may cease displaying the notification 1010 including the visual affordance 1012. The processor 120 may identify the location of the electronic device 101 based on the image including at least one visual object, and perform an operation related to an executing application based on the location of the electronic device 101.

Figure 11:
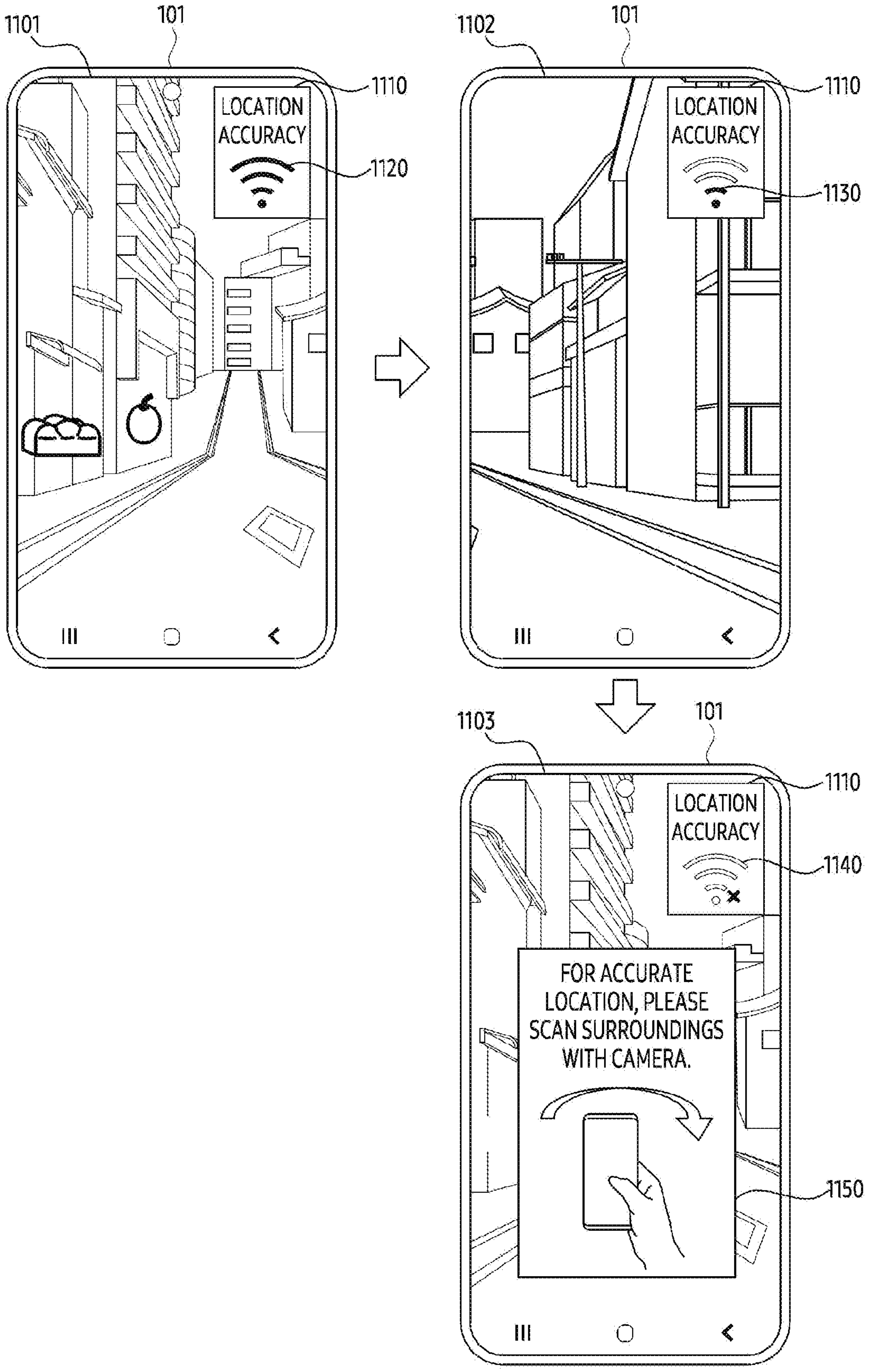
FIG. 11 is a diagram illustrating an example operation of an electronic device according to various embodiments.

FIG. 11 is a diagram illustrating an example operation of an electronic device according to various embodiments.

Referring to FIG. 11, a processor 120 may display a screen 1101 for executing a location-based application. The processor 120 may display a notification window 1110 for providing information on location accuracy superimposed on the screen 1101. The notification window 1110 may include a visual object 1120 for indicating location accuracy. For example, the processor 120 may identify a location of the electronic device 101 as a first location through a GPS. In a state in which the location of the electronic device 101 is the first location, a visual object 1120 for indicating that accuracy of a current location is within a highest range may be displayed in the notification window 1110.

For example, the processor 120 may identify at least one index for recognizing at least one external object located within a designated distance from the first location. The processor 120 may display the visual object 1120 for indicating that the accuracy of the current location is within the highest range, based on that average of at least one index identified in the first location is less than or equal to a first value.

According to an embodiment, the processor 120 may identify that the location of the electronic device 101 is changed. The processor 120 may identify that the location of the electronic device 101 is changed from the first location to a second location based on a GPS signal. The processor 120 may identify at least one index for recognizing at least one external object located within a designated distance from the second location. The processor 120 may display the notification window 1110 including a visual object 1130 for indicating that the accuracy of the current location decreases, superimposed on the screen 1102, based on that average of at least one index identified in the second location is less than or equal to a second value and exceeds the first value.

According to an embodiment, the processor 120 may identify that the location of the electronic device 101 is changed from the second location to a third location based on the GPS signal. The processor 120 may identify at least one index for recognizing at least one external object located within a designated distance from the third location. The processor 120 may display the notification window 1110 including a visual object 1140 to indicate that the accuracy of the current location becomes lowest, superimposed on the screen 1103, based on that average of at least one index identified in the third location exceeds the second value. The processor 120 may display a notification 1150 including a visual affordance for guiding to obtain an image including at least one visual object, superimposed on the screen 1103 together with the notification window 1110.

According to an embodiment, the processor 120 may receive a user input for obtaining an image including at least one visual object. The processor 120 may cease displaying the notification 1150 based on obtaining an image including at least one visual object.

According to various example embodiments, an electronic device (e.g., the electronic device 101 of FIG. 3) may comprise: a memory configured to store instructions, a camera, a display, at least one communication circuit, and at least one processor, comprising processing circuitry, operably coupled to the memory, the camera, the display, and the at least one communication circuit. At least one processor, individually and/or collectively, may be configured to: identify, through the at least one communication circuit, a location of the electronic device as a first location, based on execution of an application; identify at least one index for recognizing at least one external object located within a designated distance from the first location among a plurality of external objects, among a plurality of indexes for recognizing the plurality of external objects comprised in a digital map; identify whether the at least one index satisfies a designated condition set based on the application; display, through the display, a visual affordance for guiding to obtain an image including at least one visual object corresponding to at least in part of the at least one external object, based on the at least one index satisfying the designated condition; after displaying the visual affordance, adjust the location of the electronic device from the first location to a second location based on the image including the at least one visual object, obtained through the camera, wherein each of the plurality of indexes may be set based on first information on distribution of each of the plurality of external objects and second information on height of each of the plurality of external objects.

According to an example embodiment, at least one processor, individually and/or collectively, may be configured to: receive first data for identifying the location of the electronic device as the first location and second data related to error of the first data, through the at least one communication circuit; and identify the designated distance based on the second data, and identify the at least one index for recognizing the at least one external object located within a designated distance from the first location among the plurality of external objects.

According to an example embodiment, at least one processor, individually and/or collectively, may be configured to: identify information on accuracy of the location of the electronic device required for execution of the application; and set the designated condition based on the information on the accuracy of the location of the electronic device.

According to an example embodiment, at least one processor, individually and/or collectively, may be configured to: identify, based on the image including the at least one visual object, a binary code for the at least one visual; and receive, from the server, information on the second location and 3 dimensional (3D) data corresponding to the second location, based on transmitting the identified binary code to a server.

According to an example embodiment, at least one processor, individually and/or collectively, may be configured to: cease, based on receiving the 3D data form the server, displaying the visual affordance; and display a 2 dimensional (2D) object, obtained based on the second location and the 3D data, superimposed on the image.

According to an example embodiment, the visual affordance may be displayed superimposed on a screen for execution of the application through the display.

According to an example embodiment, the digital map may comprise a plurality of areas configured based on the plurality of indexes.

According to an example embodiment, at least one processor, individually and/or collectively, may be configured to: maintain the location of the electronic device as the first location, based on the at least one index being distinct from the designated condition; and display, through the display, a screen for execution of the application comprising an element for representing the first location.

According to an example embodiment, each of the plurality of indexes may be set by applying different weights to a first value obtained based on the first information, a second value obtained based on the second information, and a third value obtained based on information on a distribution of heights of the plurality of external objects comprised in the second information.

According to various example embodiments, a method of operating an electronic device (e.g., the electronic device 101 of FIG. 3) may comprise: identifying, through at least one communication circuit, a location of the electronic device as a first location, based on execution of an application; identifying at least one index for recognizing at least one external object located within a designated distance from the first location among a plurality of external objects, among a plurality of indexes for recognizing the plurality of external objects comprised in a digital map; identifying whether the at least one index satisfies a designated condition set based on the application; based on the at least one index satisfying the designated condition, displaying, through a display, a visual affordance for guiding to obtain an image including at least one visual object corresponding to at least in part of the at least one external; and after displaying the visual affordance, adjusting the location of the electronic device from the first location to a second location based on the image including the at least one visual object, obtained through a camera, wherein each of the plurality of indexes may be set based on first information on distribution of each of the plurality of external objects and second information on height of each of the plurality of external objects.

According to an example embodiment, the method may comprise: receiving first data for identifying, through the at least one communication circuit, the location of the electronic device as the first location and second data related to error of the first data; identifying the designated distance based on the second data, and identifying the at least one index for recognizing the at least one external object located within a designated distance from the first location among the plurality of external objects.

According to an example embodiment, the method may comprise: identifying information on accuracy of the location of the electronic device required for execution of the application; and setting the designated condition based on the information on the accuracy of the location of the electronic device.

According to an example embodiment, the method may comprise: identifying, based on the image including the at least one visual object, a binary code for the at least one visual object; and based on transmitting the identified binary code to a server, receiving, from the server, information on the second location and 3 dimensional (3D) data corresponding to the second location.

According to an example embodiment, the method may comprise: ceasing displaying the visual affordance based on receiving the 3D data form the server and displaying a 2 dimensional (2D) object, obtained based on the second location and the 3D data, superimposed on the image.

According to an example embodiment, the visual affordance may be displayed superimposed on a screen for execution of the application through the display.

According to an example embodiment, the digital map may comprise a plurality of areas configured based on the plurality of indexes.

According to an example embodiment, the method may comprise: maintaining the location of the electronic device as the first location, based on the at least one index being distinct from the designated condition; and displaying, through the display, a screen for execution of the application comprising an element for representing the first location.

According to an example embodiment, each of the plurality of indexes may be set by applying different weights to a first value obtained based on the first information, a second value obtained based on the second information, and a third value obtained based on information on a distribution of heights of the plurality of external objects comprised in the second information.

According to various example embodiments, a non-transitory computer-readable storage medium may store one or more programs comprising instructions which, when executed by at least one processor, individually and/or collectively, of an electronic device (e.g., the electronic device 101 of FIG. 3) with a camera, a display, and at least one communication circuit, cause the electronic device to: identify, through the at least one communication circuit, a location of the electronic device as a first location, based on execution of an application; identify at least one index for recognizing at least one external object located within a designated distance from the first location among a plurality of external objects, among a plurality of indexes for recognizing the plurality of external objects comprised in a digital map; identify whether the at least one index satisfies a designated condition set based on the application; display, through the display, a visual affordance for guiding to obtain an image including at least one visual object corresponding to at least in part of the at least one external object, based on the at least one index satisfying the designated condition; and after displaying the visual affordance, adjust the location of the electronic device from the first location to a second location based on the image including the at least one visual object, obtained through the camera, wherein each of the plurality of indexes may be set based on first information on distribution of each of the plurality of external objects and second information on height of each of the plurality of external objects.

According to an example embodiment, the non-transitory computer readable storage medium may store one or more programs comprising instructions which when executed by at least one processor, individually and/or collectively, of an electronic device, cause the electronic device to: identify, based on the image including the at least one visual object, a binary code for the at least one visual object; and receive, from the server, information on the second location and 3 dimensional (3D) data corresponding to the second location, based on transmitting the identified binary code to a server.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:

a memory comprising one or more storage media configured to store instructions;

a camera;

a display;

communication circuitry; and at least one processor, comprising processing circuitry, operably coupled to the memory, wherein the instructions, when executed by the at least one processor, individually and/or collectively, cause the electronic device to:

identify an event to provide location information of the electronic device to an application being executed, based on the event, identify, through the communication circuitry, a location of the electronic device as a first location, based on a location of the electronic device being identified via the communication circuitry as the first location, identify, among a plurality of indexes respectively registered with respect to regions in a digital map, at least one index with respect to a region including the first location from among the regions in the digital map, wherein each of the plurality of indexes represents complexity of a surrounding environment associated with a corresponding location of the digital map, identify whether the at least one index satisfies a designated condition, based on the at least one index satisfying the designated condition, perform a visual positioning system (VPS) for obtaining the location information, wherein performing the VPS includes:

obtaining an image including at least one visual object through the camera, and adjusting the location information of the electronic device from the first location to a second location based on the at least one visual object included in the image, and based on the at least one index not satisfying the designated condition, provide the location information regarding the first location to the application without performing VPS.

2. The electronic device of claim 1, wherein the instructions, when executed by the at least one processor, individually and/or collectively, cause the electronic device to:

receive first data for identifying, via the at least one communication circuitry, a location of the electronic device as the first location and second data related to an error of the first data, identify, based on the second data, an area within a designated distance from the first location, and identify, within the area, the at least one index related to the first location.

3. The electronic device of claim 2, wherein the designated distance is set based on the second data.

4. The electronic device of claim 1, wherein the instructions, when executed by the at least one processor, individually and/or collectively, cause the electronic device to, for performing the VPS:

obtain, via the camera, an image including at least one visual object related to a surrounding environment of the first location, identify, based on the image including the at least one visual object, a binary code for the at least one visual object, and based on transmitting the identified binary code to a server, receive, from the server, information for identifying a location of the electronic device as the second location.

5. The electronic device of claim 1, wherein the digital map comprises a plurality of areas configured based on the plurality of indices.

6. The electronic device of claim 1, wherein each of the plurality of indices is set based on first information on distribution of a plurality of external objects, and second information on heights of the plurality of external objects, and wherein the plurality of external objects are located within the surrounding environment associated with the corresponding location.

7. A method of operating an electronic device comprising a camera, communication circuitry, the method comprising:

identifying an event to provide location information of the electronic device to an application being executed, based on the event, identifying, through the communication circuitry, a location of the electronic device as a first location, based on a location of the electronic device being identified via the communication circuitry as the first location, identifying, among a plurality of indexes respectively registered with respect to regions in a digital map, at least one index with respect to a region including the first location from among the regions in the digital map, wherein each of the plurality of indexes represents complexity of a surrounding environment associated with a corresponding location of the digital map, identifying whether the at least one index satisfies a designated condition, based on the at least one index satisfying the designated condition, perform a visual positioning system (VPS) for obtaining the location information, wherein performing the VPS includes:

obtaining an image including at least one visual object through the camera, and adjusting the location information of the electronic device from the first location to a second location based on the at least one visual object included in the image, based on the at least one index not satisfying the designated condition, provide the location information regarding the first location to the application without performing VPS.

8. The method of claim 7, wherein the method comprises:

receiving first data for identifying, through via the communication circuitry, a location of the electronic device as the first location and second data related to an error of the first data, identifying, based on the second data, an area within a designated distance from the first location, and identifying, within the area, the at least one index related to the first location.

9. The method of claim 7, wherein the designated distance is set based on the second data.

10. The method of claim 7, wherein the method further comprises, for performing the VPS:

obtaining, via the camera, an image including at least one visual object related to a surrounding environment of the first location, identifying, based on the image including the at least one visual object, a binary code for the at least one visual object, and based on transmitting the identified binary code, receiving, from the server, information for identifying a location of the electronic device as the second location.

11. The method of claim 10, wherein the method comprises:

displaying, on the display, a visual affordance for guiding a user to obtain, via the camera, the image including at least one visual object.

12. The method of claim 7, wherein the method comprises:

identifying an accuracy of the first location determined based on the at least one index, and based on the accuracy of the first location, determining whether to perform the VPS.

13. The method of claim 7, wherein the digital map comprises a plurality of areas configured based on the plurality of indices.

14. The method of claim 7, wherein each of the plurality of indices is set based on first information on distribution of a plurality of external objects, and second information in heights of the plurality of external objects, and wherein the plurality of external objects are located within the surrounding environment associated with the corresponding location.

15. A non-transitory computer-readable storage medium storing one or more programs, wherein the one or more programs comprises instructions which, when executed by at least processor, individually and/or collectively, of an electronic device with a camera, a display, and communication circuitry, cause the electronic device to:

identify an event to provide location information of the electronic device to an application being executed, based on the event, identify, through the communication circuitry, a location of the electronic device as a first location, based on a location of the electronic device being identified via the communication circuitry as the first location, identify, among a plurality of indexes respectively registered with respect to regions in a digital map, at least one index with respect to a region including the first location from among the regions in the digital map, wherein each of the plurality of indexes represents complexity of a surrounding environment associated with a corresponding location of the digital map, identify whether the at least one index satisfies a designated condition, based on the at least one index satisfying the designated condition, perform a visual positioning system (VPS) for obtaining the location information, wherein performing the VPS includes:

obtaining an image including at least one visual object through the camera, and adjusting the location information of the electronic device from the first location to a second location based on the at least one visual object included in the image, and based on the at least one index not satisfying the designated condition, provide the location information regarding the first location to the application without performing VPS.

16. The non-transitory computer-readable storage medium of claim 15, wherein the one or more programs comprises instructions which, when executed by the at least processor, individually and/or collectively, of the electronic device, cause the electronic device to:

receive first data for identifying, via the at least one communication circuitry, a location of the electronic device as the first location and second data related to an error of the first data, identify, based on the second data, an area within a designated distance from the first location, and identify, within the area, the at least one index related to the first location.

17. The method of claim 12, wherein the method comprises:

based on the accuracy of the first location being less than a reference accuracy, determining to perform the VPS, and based on the accuracy of the first location being greater than the reference accuracy, determining not to perform the VPS.

18. The electronic device of claim 4, wherein the instructions, when executed by the at least one processor, individually and/or collectively, cause the electronic device to display, on the display, a visual affordance for guiding a user to obtain, via the camera, the image including at least one visual object.

19. The electronic device of claim 1, wherein the instructions, when executed by the at least one processor, individually and/or collectively, cause the electronic device to:

identify an accuracy of the first location determined based on the at least one index, and based on the accuracy of the first location, determine whether to perform the VPS.

20. The electronic device of claim 19, wherein the instructions, when executed by the at least one processor, individually and/or collectively, cause the electronic device to:

based on the accuracy of the first location being less than a reference accuracy, determine to perform the VPS, and based on the accuracy of the first location being greater than the reference accuracy, determine not to perform the VPS.

* * * * *